Figure 1:
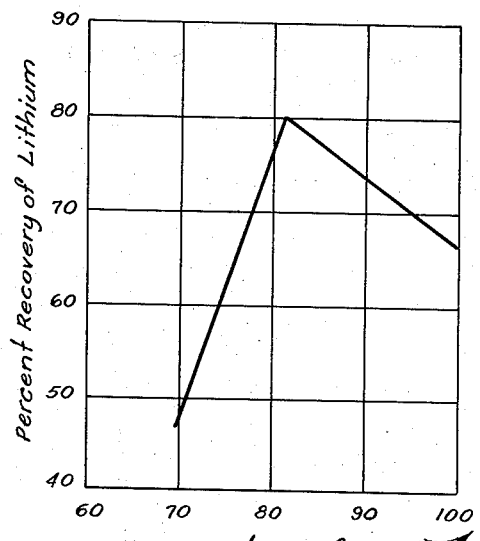

Dec. 13, 1960     R. D. GOODENOUGH     2,964,381
RECOVERY OF LITHIUM
Filed Jan. 29, 1957

INVENTOR.
Robert D. Goodenough
BY

Griswold & Burdick
ATTORNEYS

United States Patent Office 2,964,381
Patented Dec. 13, 1960

2,964,381

RECOVERY OF LITHIUM

Robert D. Goodenough, Midland, Mich., assignor to The Dow Chemical Company, Midland, Mich., a corporation of Delaware Filed Jan. 29, 1957, Ser. No. 636,953

14 Claims. (Cl. 23—25)

This invention relates to a process for recovery of lithium, and more particularly, to a process for the recovery of lithium from aqueous solutions containing alkaline earth metal salts by precipitation of the lithium as a lithium aluminate complex.

Lithium and its compounds are well known and until recently their demand has been relatively limited. The metal and its compounds are now being used in the manufacture of lithium stearate greases, oxide scavengers in metallurgical fields, welding fluxes, and in the ceramic fields, with the result that the demand has been increasing. The production of lithium has been mainly limited to recovery of the metal from spodumene, lepidolite, and other natural deposits. The lithium content in these deposits is relatively small and chemically combined so that expensive processing is necessary to recover the lithium. There are natural chloride brines and other solutions which contain relatively small amounts of lithium compounds. These solutions heretofore have not been used as sources for lithium due to the inability to economically recover the lithium therefrom in the presence of a high concentration of other soluble compounds. Some of these solutions are processed for recovery of bromine or other chemicals and are then discarded without the recovery of lithium. The ability to economically recover lithium compounds from such solutions would increase the production of lithium compounds to meet the growing demand.

It is known that an insoluble aluminate of lithium may be obtained. Various methods have been used to prepare this compound by investigators studying the chemical structure of the aluminate. These various methods are only applicable to solutions containing an alkali and the reacting salts. Attempts to use these methods to recover lithium from solutions containing alkaline earth metal salts or solutions containing a high concentration of other soluble impurities have been unsuccessful. Precipitates of metals other than lithium are preferentially formed.

Figure 2:
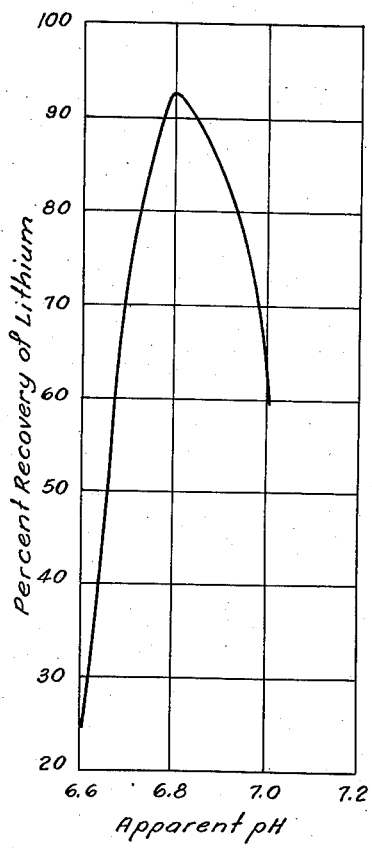
Figure 3:
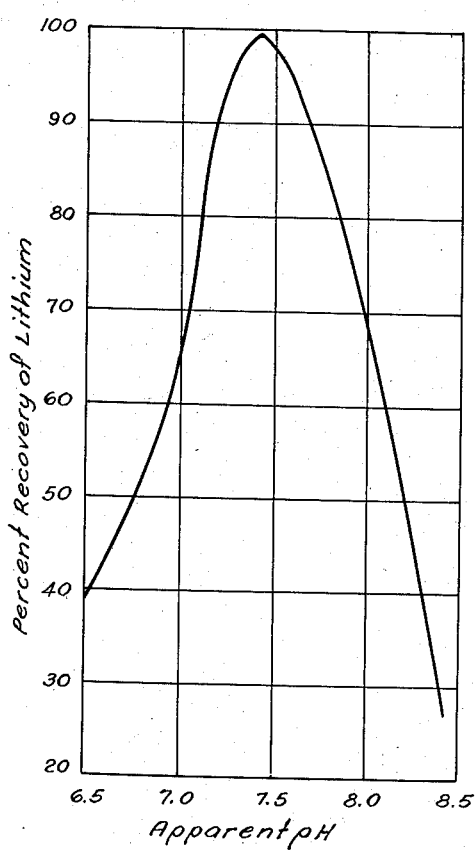

It is, therefore, a principal object of this invention to provide a process for the recovery of lithium from aqueous solutions containing alkaline earth metal salts. Another object is to provide a process by which lithium may be economically recovered from a chloride solution containing a relatively small amount of lithium compounds. A further object is to provide a process for recovery of lithium from solutions containing a high concentration of soluble impurities. Other objects and advantages of this invention will become apparent from the following detailed description thereof when read in conjunction with the accompanying drawings, in which:

Figure 1 is a graph plotting the percent of lithium recovered from a relatively concentrated chloride solution containing magnesium compounds and other chloride salts as a function of the temperature of the solution, Figure 2 is a graph plotting the percent of lithium recovered from a relatively concentrated chloride solution containing magnesium compounds and other chloride salts as a function of the soluble alkalinity of the solution, and Figure 3 is a graph plotting the percent of lithium recovered from a relatively concentrated chloride solution after the magnesium compounds have been removed as a function of the soluble alkalinity of the solution.

It has been found that the above and additional objects may be accomplished by intermixing an aluminum compound, either freshly-precipitated aluminum hydroxide in the bayerite form or soluble aluminum salts, with an aqueous solution containing lithium and alkaline earth metals and precipitating a major portion of the lithium as a lithium aluminate complex without concomitantly precipitating substantial quantities of alkaline earth metals by controlling the temperature and the alkalinity of the solution. Over 90 percent of the lithium in a solution containing as little as 0.01 weight percent of a lithium salt and over 35 weight percent of other soluble compounds may be recovered by the invention. This makes it possible to economically recover lithium not only from solutions containing small amounts of lithium but also from solutions containing a high percentage of other soluble impurities, such as salts of calcium, magnesium, sodium, potassium, strontium, and others.

The actual composition of the precipitate is not known, but it appears to be a hydrated lithium aluminate complex and contains lithium and aluminum in an atomic ratio of 1Li:2–3.5Al. X-ray diffraction analysis indicates an unreported structure and a slight amount of aluminum hydroxide in the bayerite form. When the precipitate is made from a chloride solution, analysis shows the presence of chloride ions in the complex. Thus, it is not known whether a lithium chloroaluminate complex is precipitated or whether the presence of the chlorine is due to occlusion of some chloride salts by the complex or both.

The lithium aluminate complex may be obtained by adding freshly precipitated aluminum hydroxide in the bayerite form to the lithium bearing solution or by the addition of a soluble aluminum salt to the solution and forming the aluminum hydroxide therein. By controlling the alkalinity and the temperature, the lithium from the solution will combine with the aluminum hydroxide to form the complex. It is preferred to precipitate the aluminum hydroxide in the solution instead of adding the hydroxide, since under the required conditions the complex can be formed as soon as the aluminum hydroxide is precipitated. The required conditoins of temperature and alkalinity for the precipitation of the lithium aluminate complex are the same whether the aluminum hydroxide is added to the solution or formed in situ.

In the precipitation of the lithium aluminate complex, the aluminum compound is added to the solution in amounts in excess of the stoichiometric amount required to react with the lithium present. It is preferred to use a stoichiometric excess of around 100 to 300 percent. A more complete recovery of the lithium may be obtained with the excess of the aluminum compound, especially, in solutions which contain a high concentration of other soluble salts. It is desirable to control the temperature of the solution and also to control the soluble alkalinity of the solution within a range of usually less than 0.25 of an apparent pH unit. When the aluminum salt is added to the solution, the alkalinity must be below the given range and then the alkalinity of the solution adjusted by approaching from the acid side. To obtain the desired alkalinity, a predetermined amount of a strongly alkaline soluble aluminate, such as sodium aluminate or a strong soluble hydroxide, such as sodium hydroxide, potassium hydroxide, and ammonium hydroxide, may be added to the aluminum containing solution. Calcium hydroxide may also be used. It is preferred to use a relatively dilute solution of the particular hydroxide or aluminate and to add the solution with vigorous agitation to insure intimate mixing and to prevent high alkalinity in localized parts of the solution. If the apparent alkalinity of the solution is above the desired range, the magnesium and the other alkaline earth metals displace the lithium from the aluminate complex and also the magnesium precipitates as magnesium hydroxide. Once these precipitates are formed, the lithium will not displace the metals in the aluminate complex nor will the magnesium hydroxide rapidly go back into solution when the alkalinity of the solution is corrected. Generally after the precipitation of the complex, the yield of the complex may be increased by allowing the mixture to set for 1 to 8 hours before recovering the complex.

The aluminum compounds which may be employed, in addition to freshly precipitated bayerite aluminum hydroxide, are soluble aluminum salts. Soluble aluminum salts which will not cause the precipitation of the alkaline earth metals at the temperature and the apparent pH at which the lithium aluminate complex is precipitated are preferred. These preferred aluminum salts include soluble acidic salts, such as aluminum chloride, aluminum nitrate, aluminum acetate, etc., or alkaline salts, such as sodium aluminate, etc. When aluminum hydroxide or alkaline aluminate salts are used, the lithium solution must be sufficiently acidic so that the soluble alkalinity of the resulting mixture will not exceed the alkalinity necessary for the precipitation of the complex. Aluminum salts of anions which will precipitate the alkaline earth metals such as aluminum sulfate, etc., may be used for aqueous lithium solutions having relatively small amounts of lithium. However, when these salts are used, the alkaline earth metal precipitate formed by the addition of these salts to the lithium solution is generally removed prior to the precipitation of the lithium aluminate complex, and the separation of the lithium aluminate complex accomplished in the herein described manner.

Many of the solutions which contain small amounts of lithium may contain large amounts of magnesium compounds. If desired, these magnesium compounds may be removed prior to precipitation of the lithium. When the magnesium compounds are substantially removed, the temperature and the alkalinity of the solution, while critical, do not have to be as closely controlled. The magnesium compounds may be removed by adding a strong hydroxide, such as sodium hydroxide, potassium hydroxide, and calcium hydroxide, to the aqueous solution to precipitate the magnesium compounds as magnesium hydroxide. Generally the amount of the hydroxide used is slightly in excess of the stoichiometric amount required to react with the magnesium compounds present. The precipitated magnesium hydroxide is removed from the remainder of the solution by known methods, such as filtration, centrifuging, and others. After the magnesium hydroxide is removed, a soluble aluminum salt or freshly precipitated aluminum hydroxide in the bayerite form can be added to the substantially magnesium free solution and the lithium precipitated in the manner described above. The alkalinity of the solution to precipitate the lithium aluminate complex will differ from that required when the magnesium compounds have not been removed. Usually a range of around 0.5 apparent pH unit may be tolerated. The alkalinity of the mixture of the lithium solution and aluminum compound may slightly exceed the required alkalinity for the precipitation of the complex and be corrected by addition of an acid, such as hydrochloric acid and nitric acid, or by addition of a soluble acidic aluminum salt without greatly affecting the amount of lithium recovered.

The alkalinity of relatively concentrated salt solutions is hard to determine or express accurately. The pH of the solution as determined by use of a pH meter indicates only an apparent pH and not necessarily the correct value because of the "salt error" of the electrode. More reproducible values of alkalinity may be obtained by basing the alkalinity upon the titration of a given amount of the solution. Since the determination of the alkalinity of a solution may be very readily made with a pH meter, the alkalinity, herein, is expressed both as the apparent pH and the number of ml. of standard 0.1 N HCl solution required to titrate to the methyl red end point a 100-ml. sample of the mother liquor diluted to 200 ml. by addition of water. In determining the alkalinity of the precipitating mixture, the precipitate is separated from the mixture and the alkalinity of the mother liquor determined after diluting with an equal volume of water. This is, herein, referred to as "soluble alkalinity." In obtaining the apparent pH, a saturated calomel-glass electrode system similar to the type employed in Beckman Model H–2 pH meter was used. The relationship between the apparent pH and titrations may be seen in the examples.

The alkalinity required for the precipitation of lithium aluminate complex depends upon the particular lithium solution used and the concentration of salts other than lithium in the solution. Generally a lower alkalinity is required for the more concentrated solutions. Thus, one specific range does not work for all solutions, but the required alkalinity for any particular solution may be easily determined. For relatively concentrated chloride solutions from which the magnesium compounds have not been removed, an apparent pH in the range of 6.6 to 7.0 is used which, when based upon acid titration, requires from 1.76 to 3.08 ml. of 0.1 N HCl to neutralize the soluble alkalinity in a 100 ml. sample. An alkalinity in the range of 6.7 to 6.9 is preferred. When the magnesium compounds are substantially removed prior to the precipitation of the lithium aluminate complex, an apparent pH in the range of 7.0 to 8.1 is used, preferably in the range of 7.3 to 7.6. In nitrate solutions generally a lower pH is employed. An apparent pH from 6.0 to 7.0, preferably in the range of 6.4 to 6.6 is used for relatively concentrated solutions.

The temperature required likewise will depend upon the solution and the concentration of the solution. The temperature will not only determine the amount of lithium which will precipitate but also determines the amount of the other compounds which will precipitate from the solution. When precipitation runs are made from the same solutions and under identical conditions except for the temperature, the resulting alkalinity of the mother liquor obtained will differ due to the reaction and precipitation of some of the soluble impurities, especially magnesium. In dilute chloride solutions, temperatures close to room temperature may be used. As the concentration increases, a higher temperature is generally required. Where magnesium is not present, the complex may be precipitated from relatively concentrated chloride solutions at a temperature from 20° to 100° C., preferably from 20° to 50° C. However, with the presence of magnesium a temperature from 55° to 100° C., preferably from 80° to 90° C., is employed. For nitrate solutions the magnesium concentration does not materially affect the required temperature, and temperatures in the range of 20° to 100° C. may be used for all solutions, preferably in the range of 20° to 50° C.

The effects of the alkalinity and the temperature on the lithium recovery for a relatively concentrated chloride solution containing magnesium compounds are shown in Figure 1 and Figure 2. Figure 1 shows the effect of the temperature of the solution and Figure 2 illustrates the effect of the apparent pH. Details and data upon which these figures are based are shown in Example I and II below.

In Figure 1, the abscissa represents the temperature of the solution and the ordinate represents the percent of lithium recovered in the precipitate. It is apparent from the curve that the temperature must be closely controlled within a narrow range in order to obtain a good recovery of the lithium.

In Figure 2, the abscissa represents the apparent pH of the solution and the ordinate represents the percent of lithium recovered as lithium aluminate complex from the solution. It will be noted from the plot that around 92 percent of the lithium may be recovered at an apparent pH of 6.8 and that the percent recovery rapidly drops on either side of this value.

Figure 3 illustrates the effect of the apparent pH of the solution on the percent recovery of the lithium when the magnesium compounds have been removed. From the curve, it will be noted that in order to obtain a good recovery of lithium that the apparent pH should be in the range of 7.0 to 8.1, preferably in the range of 7.3 to 7.6. The details and data upon which Figure 3 is based are given in Example III below.

The final recovery of the lithium from the lithium aluminate complex may be made by the various methods apparent to those skilled in the art. Methods described in the copending applications, Serial Number 636,955, filed the same day as instant application, by the same inventor as instant application, and Serial Number 636,869, filed the same day as instant application, of which the inventor of instant application is co-inventor, may be used. By these methods the lithium aluminate complex may be hydrothermally decomposed and a dilute solution concentrated by use of ion exchange resins or the lithium recovered by direct treatment with ion exchange resins.

The following examples further illustrate the invention, but are not to be construed as limiting the invention thereto.

Example I

To show the effect of temperature upon the recovery of lithium from a natural chloride brine, a series of runs was made under similar conditions except that a different temperature was used to precipitate the lithium aluminate complex. The brine used had a specific gravity of 1.252 at 25° C. and contained the following chlorides in weight percent and the balance water:

| | | | |
|---|---|---|---|
| $CaCl_2$ | 22.0 | KCl | 1.65 |
| $MgCl_2$ | 3.63 | $SrCl_2$ | 0.48 |
| NaCl | 5.70 | LiCl | 0.034 |

To 175 ml. of the brine, 1.53 gm. of aluminum chloride hexahydrate was added. The brine with the hexahydrate was heated to the desired temperature and 9.0 ml. of 2 N sodium hydroxide was added at a rate of 2 ml. per minute to bring about the precipitation of the lithium aluminate complex. The mixture was vigorously agitated during the addition of the hydroxide. After the addition of the alkaline solution, the mixture was maintained at the temperature for a short time, allowed to cool to room temperature (20° to 25° C.), and then centrifuged.

The alkalinity of the mother liquor was determined by diluting a 100-ml. sample of the mother liquor with 100 ml. of water and titrating the resulting solution with 0.1 N HCl to the methyl red end point. Also, the apparent pH of the diluted mother liquor was determined by a pH meter.

An analysis of the mother liquor and the precipitate was made by flame spectrophotometry and the percent recovery of the lithium chloride from the solution was calculated. The results which are plotted in Figure 1 and the pertinent data are given in the table below.

| Run Number | 1 | 2 | 3 | 4 |
|---|---|---|---|---|
| Brine, ml | 175 | 175 | 175 | 175 |
| $AlCl_3 \cdot 6H_2O$, gm | 1.53 | 1.53 | 1.53 | 1.53 |
| Temperature, °C | 70 | 80 | 90 | 100 |
| 2 N NaOH Added, ml | 9.0 | 9.0 | 9.0 | 9.0 |
| Apparent pH | 6.7 | 6.6 | 6.4 | 6.4 |
| 0.1 N HCl to Titrate 100 ml. sample, ml | 3.65 | 2.71 | 1.96 | 2.04 |
| Percent Recovery of Lithium | 48.3 | 76.3 | 82.0 | 67.7 |

Example II

To illustrate the effect of alkalinity upon the lithium recovery, a brine similar to the one of Example I was used except that the specific gravity was 1.259 at 25° C. and it contained 0.029 weight percent lithium chloride instead of 0.034 weight perecnt. A series of runs was made under the same conditions except that the amount of 2 N sodium hydroxide used was changed in each run.

The procedure and analysis as described in Example I were used. The precipitation temperature was 85° C. The results which are plotted in Figure 2 and the pertinent data are shown in the table below.

| Run Number | 1 | 2 | 3 | 4 | 5 |
|---|---|---|---|---|---|
| Brine, ml | 175 | 175 | 175 | 175 | 175 |
| $AlCl_3 \cdot 6H_2O$, gm | 1.53 | 1.53 | 1.53 | 1.53 | 1.53 |
| 2 N NaOH Added, ml | 10.5 | 11.0 | 11.5 | 12.5 | 13.0 |
| Apparent pH | 6.6 | 6.7 | 6.8 | 6.9 | 7.0 |
| 0.1 N HCl to Titrate 100 ml. sample, ml | 1.76 | 2.04 | 2.20 | 2.50 | 3.08 |
| Percent Recovery of Lithium | 24.6 | 67.4 | 92.5 | 85.0 | 63.9 |

Example III

To show the effect of the alkalinity on the recovery of lithium when the magnesium compounds have been substantially removed, a series of runs was made with a brine similar to the brine used in Example II.

To 500 ml. of the brine, 18.3 gm. of lime was added precipitating the magnesium in the brine as magnesium hydroxide. The magnesium hydroxide was filtered off. Water was added to the filtrate to make 500 ml. of solution. In the runs, 0.36 gm. of aluminum chloride hexahydrate and different amounts of 1 N sodium hydroxide were added to 40 ml. samples of the above filtrate solution. The precipitation was carried out at room temperature.

The lithium aluminate complex was separated from the mother liquor by centrifuging and analyzed as in the other examples.

The results and the pertinent data are given in the table below. The results are also plotted in Figure 3.

| Run Number | 1 | 2 | 3 | 4 | 5 | 6 |
|---|---|---|---|---|---|---|
| Filitrate, ml | 40 | 40 | 40 | 40 | 40 | 40 |
| $AlCl_3 \cdot 6H_2O$, gm | 0.36 | 0.36 | 0.36 | 0.36 | 0.36 | 0.36 |
| 1 N NaOH Added, ml | 3.94 | 4.12 | 4.55 | 4.71 | 5.47 | 6.02 |
| Apparent pH | 6.5 | 7.0 | 7.3 | 7.6 | 8.0 | 8.40 |
| Percent Recovery of Lithium | 39 | 59 | 97 | 96 | 68 | 25 |

Example IV

Lithium was recovered from a high calcium chloride brine having essentially the following analysis in weight percent with the remainder water:

| | | | |
|---|---|---|---|
| $CaCl_2$ | 40.0 | KCl | 0.92 |
| $MgCl_2$ | 0.1 | $SrCl_2$ | 0.70 |
| NaCl | 0.28 | LiCl | 0.05 |

To 20 ml. (28.2 gm.) of the brine, 0.32 of aluminum chloride hexahydrate and 0.095 gm. of calcium hydroxide were added. The precipitation of the lithium aluminate complex was made at room temperature and at an apparent pH of 7.1.

The mother liquor and precipitate were analyzed as in other Examples and it was found that 83 percent of the lithium had been recovered.

Example V

Lithium was recovered from a synthetic nitrate brine. A solution was made by dissolving 189 gm. of calcium nitrate, 35.8 gm. of magnesium nitrate, and 0.416 gm. of lithium nitrate in sufficient amount of water to make 500 ml. of solution.

A series of runs was made where 1.09 gm. of aluminum nitrate hydrate and different amounts of 1 N sodium hydroxide were added to 80 ml. samples of the synthetic brine. The precipitation was carried out at room temperature.

The procedure used was similar to that described in the previous examples and the results obtained are shown below:

| Run Number | 1 | 2 | 3 |
|---|---|---|---|
| Solution, ml | 80 | 80 | 80 |
| Al(NO$_3$)$_3$·9H$_2$O | 1.09 | 1.09 | 1.09 |
| 1 N NaOH, ml | 7.96 | 8.7 | 10.0 |
| Apparent pH | 6.0 | 6.5 | 7.0 |
| Percent Recovery of Lithium | 74.7 | 96.3 | 90.9 |

What is claimed is:

1. A process for the recovery of lithium values from an aqueous lithium solution containing at least one alkaline earth metal salt, which comprises intermixing with the solution a soluble aluminum salt in a stoichiometric excess to react with the lithium present in the solution at an apparent pH in the range of 6.0 to 8.1 and at a temperature in the range of 20° to 100° C. to precipitate as lithium aluminate complex a major portion of the lithium values present in said aqueous lithium solution without concomitantly precipitating substantial quantities of alkaline earth metals.

2. A process for the recovery of lithium values from a lithium chloride aqueous solution containing a magnesium salt, which comprises intermixing with the solution a soluble aluminum salt in a stoichiometric excess to react with the lithium present in the solution at a soluble alkalinity in the range of 6.6 to 7.0 apparent pH and a temperature in the range of 55° to 100° C. to precipitate a major portion of the lithium values in said aqueous lithium solution as a lithium aluminate complex without concomitantly precipitating substantial quantities of alkaline earth metals.

3. A process for the recovery of lithium values from a lithium chloride aqueous solution containing an alkaline earth metal salt other than a magnesium salt, which comprises intermixing with the solution a soluble aluminum salt in a stoichiometric excess to react with the lithium present in the solution at an apparent pH in the range of 7.0 to 8.1 and a temperature in the range of 20° to 100° C. to precipitate a major portion of lithium values as lithium aluminate complex.

4. A process for the recovery of lithium values from an aqueous lithium chloride solution containing a magnesium salt, which comprises intermixing with the solution a soluble aluminum salt in a stoichiometric excess to react with the lithium present in the solution adding a basic compound selected from the group consisting of strongly alkaline soluble hydroxides, calcium hydroxide, and strongly alkaline soluble aluminates to the mixture at a temperature in the range of 55° to 100° C. until a soluble alkalinity in the range of 6.6 to 7.0 apparent pH is obtained to precipitate the lithium values as a lithium aluminate complex, and separating the complex.

5. A process for the recovery of lithium values from a lithium chloride solution containing a magnesium salt, which comprises intermixing with the solution a soluble aluminum salt in a stoichiometric excess to react with the lithium present in the solution, adding a strongly alkaline soluble hydroxide to the mixture at a temperature in the range of 55° to 100° C. until an apparent pH in the range of 6.6 to 7.0 is obtained to precipitate the lithium values as a lithium aluminate complex, and separating the complex.

6. A process for the recovery of lithium values from an aqueous lithium chloride solution containing a magnesium salt, which comprises intermixing with the solution aluminum chloride in a stoichiometric excess to react with the lithium present in the solution, subsequently adding a strongly alkaline soluble hydroxide to the mixture at a temperature in the range of 80° to 90° C. until the apparent pH is in the range of 6.7 to 6.9 to precipitate the lithium values as a lithium aluminate complex, and separating the complex.

7. A process for the recovery of lithium values from an aqueous lithium chloride solution containing a magnesium salt, which comprises intermixing with the solution aluminum chloride in a stoichiometric excess to react with the lithium present in the solution, subsequently adding sodium aluminate to the mixture at a temperature in the range of 80° to 90° C. until the apparent pH is in the range of 6.7 to 6.9 to precipitate the lithium values as a lithium aluminate complex, and separating the complex.

8. A process for the recovery of lithium values from a lithium nitrate aqueous solution containing at least one alkaline earth metal salt, which comprises intermixing with the solution a soluble aluminum salt in a stoichiometric excess to react with the lithium present in the solution at a soluble alkalinity in the range of 6.0 to 7.0 apparent pH and a temperature in the range of 20° to 100° C. to precipitate a major portion of lithium values as lithium alminate complex without concomitantly precipitating substantial quantities of alkaline earth metals.

9. A process for the recovery of lithium values from an aqueous lithium nitrate solution containing at least one alkaline earth metal salt, which comprises intermixing with the solution a soluble aluminum salt in a stoichiometric excess to react with the lithium present in the solution, adding to the resulting mixture a basic compound selected from the group consisting of strongly alkaline soluble hydroxides, calcium hydroxide, and strongly alkaline soluble aluminates at a temperature in the range of 20° to 100° C. until the apparent pH is in the range of 6.0 to 7.0 to precipitate the lithium values as lithium aluminate complex, and separating the complex.

10. A process for the recovery of lithium values from an aqueous lithium nitrate solution containing at least one alkaline earth metal salt, which comprises intermixing with the solution aluminum nitrate in a stoichiometric excess to react with the lithium present in the solution, adding a strongly alkaline soluble hydroxide to the mixture at a temperature in the range of 20° to 50° C. until the apparent pH is in the range of 6.4 to 6.6 to precipitate the lithium values as lithium aluminate complex, and separating the complex.

11. A process for the recovery of lithium values from a lithium chloride aqueous solution containing a magnesium salt, which comprises adding a strongly alkaline hydroxide to said solution to precipitate the magnesium as magnesium hydroxide, removing the magnesium hydroxide to obtain a substantially magnesium-free solution, intermixing with the substantially magnesium-free solution a soluble aluminum salt in a stoichiometric excess to react with the lithium present in the substantially magnesium-free solution at a temperature in the range of 20° of 100° C., and at an alkalinity in the range of 7.0 to 8.1 apparent pH to precipitate the major portion of the lithium values as a lithium aluminate complex, and separating the complex.

12. A process for the recovery of lithium values from a lithium chloride aqueous solution containing a magnesium salt, which comprises intermixing the lithium containing solution with a strongly alkaline hydroxide in amounts slightly in excess of the stoichiometric amount required to react with the magnesium ions in the solution to form magnesium hydroxide, removing the magnesium hydroxide to obtain a substantially magnesium-free solution, intermixing with the substantially magnesium-free solution a soluble aluminum salt in a stoichiometric excess to react with the lithium present in the substantially magnesium-free solution, adding to the resulting mixture a basic compound selected from the group consisting of strongly alkaline soluble hydroxides, calcium hydroxide, and strongly alkaline soluble aluminates at a temperature in the range of 20° to 100° C. until the apparent pH is in the range of 7.0 to 8.1 to precipitate the lithium values as a lithium aluminate complex, and separating the complex.

13. A process for recovery of lithium values from a lithium chloride aqueous solution containing a magnesium salt, which comprises intermixing the lithium containing solution with a strongly alkaline hydroxide in amounts slightly in excess of the stoichiometric amounts required to react with the magnesium ions in the solution to form magnesium hydroxide, removing the magnesium hydroxide to obtain a substantially magnesium-free solution, intermixing with the substantially magnesium-free solution aluminum chloride in a stoichiometric excess to react with the lithium present in the substantially magnesium-free solution, adding to the resulting mixture a basic compound selected from the group consisting of strongly alkaline soluble hydroxides, calcium hydroxide, and strongly alkaline soluble aluminates at a temperature in the range of 20° to 100° C. until the apparent pH is in the range of 7.1 to 8.1 to precipitate the lithium values as lithium aluminate complex, and separating the complex.

14. A process according to claim 13 wherein the temperature is in the range of 20° to 50° C. and the apparent pH is in the range of 7.3 to 7.6.

References Cited in the file of this patent

UNITED STATES PATENTS 2,044,018    Rosett et al. _____ June 16, 1936

FOREIGN PATENTS 633,008    Great Britain _____ Dec. 5, 1949

OTHER REFERENCES

Horan et al.: "J. Am. Chem. Soc.," vol. 57, pages 2434–2436, 1935.

Mellor: "Comprehensive Treatise on Inorganic and Theoretical Chemistry," Longmans Green and Co., New York, vol. 5, pages 278, 286, 287 (1923).